(12) United States Patent
Varanasi (10) Patent No.: US 11,124,447 B2
(45) Date of Patent: Sep. 21, 2021

(54) COATED GLASS ARTICLE HAVING AN ANTI-REFLECTIVE COATING AND LAMINATED GLASS THEREOF

(71) Applicant: PILKINGTON GROUP LIMITED, Lathom (GB)

(72) Inventor: Srikanth Varanasi, Ottawa Hills, OH (US)

(73) Assignee: Pilkington Group Limited, Lathom (GB)

(*) Notice: Subject to any disclaimer, the term of this patent is extended or adjusted under 35 U.S.C. 154(b) by 401 days.

(21) Appl. No.: 14/999,853

(22) PCT Filed: Feb. 12, 2015

(86) PCT No.: PCT/GB2015/050383
§ 371 (c)(1),
(2) Date: Jul. 11, 2016

(87) PCT Pub. No.: WO2015/121648
PCT Pub. Date: Aug. 20, 2015

(65) Prior Publication Data
US 2017/0204000 A1    Jul. 20, 2017

Related U.S. Application Data

(60) Provisional application No. 61/938,783, filed on Feb. 12, 2014, provisional application No. 62/064,649, filed on Oct. 16, 2014.

(51) Int. Cl.
*C03C 17/34* (2006.01)
*G02B 1/115* (2015.01)
*B32B 17/10* (2006.01)

(52) U.S. Cl.
CPC .... *C03C 17/3417* (2013.01); *B32B 17/10036* (2013.01); *B32B 17/10201* (2013.01);
(Continued)

(58) Field of Classification Search
CPC .......... C03C 17/3417; C03C 2217/734; C03C 2217/212; C03C 2217/213; G02B 1/11;
(Continued)

(56) References Cited

U.S. PATENT DOCUMENTS 4,187,336 A    2/1980    Gordon
4,206,252 A    6/1980    Gordon
(Continued)

FOREIGN PATENT DOCUMENTS

EP    1291331 A2    3/2003
FR    2713624 A1    6/1995
WO    97/43224 A1    11/1997

OTHER PUBLICATIONS

"The Essential Macleod" Jan. 5, 2006, archived webpage downloaded from the wayback machine Feb. 17, 2019 (Year: 2006).*
(Continued)

*Primary Examiner* — Cara E Rakowski
(74) *Attorney, Agent, or Firm* — Marshall & Melhorn, LLC (57) ABSTRACT

A coated glass article includes a glass substrate. A coating is formed over the glass substrate. The coating includes a first inorganic metal oxide layer deposited over a major surface of the glass substrate. The first inorganic metal oxide layer has a refractive index of 1.6 or more. A second inorganic metal oxide layer is deposited over the first inorganic metal oxide layer. The second inorganic metal oxide layer has a refractive index which is less than the refractive index of the first inorganic metal oxide layer. A third inorganic metal oxide layer is deposited over the second inorganic metal oxide layer. The third inorganic metal oxide layer has a refractive index of 2.2 or more and the refractive index of the third inorganic metal oxide layer is greater than the refractive index of the second inorganic metal oxide layer. A fourth inorganic metal oxide layer is deposited over the third
(Continued)

inorganic metal oxide layer. The fourth inorganic metal oxide layer has a refractive index which is less than the refractive index of the third inorganic metal oxide layer. The coated glass article exhibits a total visible light reflectance of less than 6.5%.

15 Claims, 2 Drawing Sheets

(52) U.S. Cl.
CPC ........ *B32B 17/10761* (2013.01); *G02B 1/115* (2013.01); *B32B 2255/20* (2013.01); *B32B 2457/208* (2013.01); *C03C 2217/211* (2013.01); *C03C 2217/734* (2013.01); *C03C 2218/1525* (2013.01)

(58) Field of Classification Search
CPC ........... G02B 1/111–116; G02B 5/282; G02B 5/285; G02B 5/286; B32B 17/10201; B32B 2255/20
See application file for complete search history.

(56) References Cited

U.S. PATENT DOCUMENTS

| | | | |
|---|---|---|---|
| 4,419,386 A | 12/1983 | Gordon | |
| 5,170,291 A * | 12/1992 | Szczyrbowski | C03C 17/3417 359/580 |
| 6,074,730 A * | 6/2000 | Laird | C03C 17/3417 359/580 |
| 6,165,598 A * | 12/2000 | Nelson | C03C 17/3417 359/359 |
| 6,337,771 B1 * | 1/2002 | Chu | G02B 1/116 313/635 |
| 6,924,037 B1 | 8/2005 | Joret et al. | |
| 2006/0188730 A1 * | 8/2006 | Varanasi | A47F 3/0434 428/432 |
| 2008/0028984 A1 * | 2/2008 | Meredith | C03C 17/34 106/287.17 |
| 2013/0183489 A1 | 7/2013 | Cremer et al. | |

OTHER PUBLICATIONS

European Patent Office, International Search Report and Written Opinion issued in PCT/GB2015/050383; dated Apr. 29, 2015; 11 pages, Rijswijk, Netherlands.

Howell, D. R. et al. "Industrial Materials for the Future R&D Strategies: A Case Study of Chemical Vapor Deposition (CVD) Methods—Applying Low-E Coatings to Flat Glass for Applications in Sunbelt Locations" Prepared for Industrial Materials for the Future Program Office of Industrial Technologies U.S. Department of Energy, Oct. 2002.

* cited by examiner

COATED GLASS ARTICLE HAVING AN ANTI-REFLECTIVE COATING AND LAMINATED GLASS THEREOF

CROSS-REFERENCE TO RELATED APPLICATIONS

This application is claiming the benefit, under 35 U.S.C. 119(e), of the provisional application which was granted Ser. No. 61/938,783 and filed on Feb. 12, 2014 and the provisional application which was granted Ser. No. 62/064,649 and filed on Oct. 16, 2014, the entire disclosures of which are hereby incorporated by reference.

BACKGROUND OF THE INVENTION

The invention relates to a coated glass article having an anti-reflective coating. More particularly, the invention relates to a coated glass article having an anti-reflective coating that exhibits a high sheet resistance. The invention also relates to a laminated glass unit comprising the coated glass article.

Touch screen electronic devices include screens which are made of glass. Excessive glare from the touch screen can make the electronic device unreadable and difficult to use. Reducing the glare from the viewing screen would improve the readability and usability of the device.

Thin-film coatings on glass are commonly utilized to provide specific visible light transmittance properties. Such coatings may be designed to be anti-reflective in order to reduce visible light reflectance. Typically, the reduction in reflectance is achieved by the principle of optical interference. When light impinges on the air-film, film-film, and film-glass interfaces, a portion of the beam is reflected at each interface. By proper choice of materials and thicknesses, the individual reflected light beams can destructively interfere with each other thereby reducing the observed visual reflectance.

It would be advantageous to provide a coated glass article having an anti-reflective coating that could be utilized as a touch screen in an electronic device. For certain applications, it would also be desirable for the coated glass article to also exhibit a high sheet resistance. Additionally, for certain applications, it would also be desirable to combine two of the coated glass articles to provide a laminated glass unit.

BRIEF SUMMARY OF THE INVENTION

Embodiments of a coated glass article are provided.

In an embodiment, the coated glass article comprises a glass substrate. A coating is formed over the glass substrate. The coating comprises a first inorganic metal oxide layer deposited over a major surface of the glass substrate. The first inorganic metal oxide layer has a refractive index of 1.6 or more. A second inorganic metal oxide layer is deposited over the first inorganic metal oxide layer. The second inorganic metal oxide layer has a refractive index which is less than the refractive index of the first inorganic metal oxide layer. A third inorganic metal oxide layer is deposited over the second inorganic metal oxide layer. The third inorganic metal oxide layer has a refractive index of 2.2 or more and the refractive index of the third inorganic metal oxide layer is greater than the refractive index of the second inorganic metal oxide layer. A fourth inorganic metal oxide layer is deposited over the third inorganic metal oxide layer. The fourth inorganic metal oxide layer has a refractive index which is less than the refractive index of the third inorganic metal oxide layer. The coated glass article exhibits a total visible light reflectance of less than 6.5%.

In another embodiment, the coated glass article comprises a glass substrate and a coating formed on the glass substrate. The coating comprises a first inorganic metal oxide layer deposited on a major surface of the glass substrate. The first inorganic metal oxide layer has a refractive index of 1.6 or more and comprises tin oxide or titanium dioxide. A second inorganic metal oxide layer is deposited over the first inorganic metal oxide layer. The second inorganic metal oxide layer has a refractive index which is less than the refractive index of the first inorganic metal oxide layer and comprises silicon dioxide. A third inorganic metal oxide layer is deposited over the second inorganic metal oxide layer. The third inorganic metal oxide layer comprises titanium dioxide and has a refractive index of 2.2 or more. The refractive index of the third inorganic metal oxide layer is greater than the refractive index of the second inorganic metal oxide layer. A fourth inorganic metal oxide layer is deposited over the third inorganic metal oxide layer. The fourth inorganic metal oxide layer has a refractive index which is less than the refractive index of the third inorganic metal oxide layer and comprises silicon dioxide. The coated glass article exhibits a total visible light reflectance of less than 6.5% and a sheet resistance of greater than $1.0 \times 10^5$ ohm/sq.

A laminated glass unit is also provided. The laminated glass unit comprises two coated glass articles as claimed in claim 1 or claim 12. The coated glass articles are in a parallel relationship with each other and each coated glass article comprises a second major surface which is adhesively bonded to a polymeric interlayer provided between the coated glass articles. The laminated glass unit exhibits a total visible light reflectance of 2.5 or less and total visible light transmittance of 95% or more.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific layers, articles, methods and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Embodiments of a coated glass article 10 in accordance with the invention will be described below. The embodiments of the coated glass article 10 may be utilized as a single coated glass sheet. For example, the coated glass article may be utilized as a portion of a touch screen for an electronic device or in other electronic interface devices.

Also, the embodiments of the coated glass article 10 may be utilized in combination in, for example, a laminated glass unit 30. Additionally, embodiments of the coated glass article 10 may be utilized as a single coated glass sheet or as a laminated glass unit in, for example, a glazing and/or for architectural, residential, commercial, photovoltaic, automotive and aerospace applications.

Figure 1:
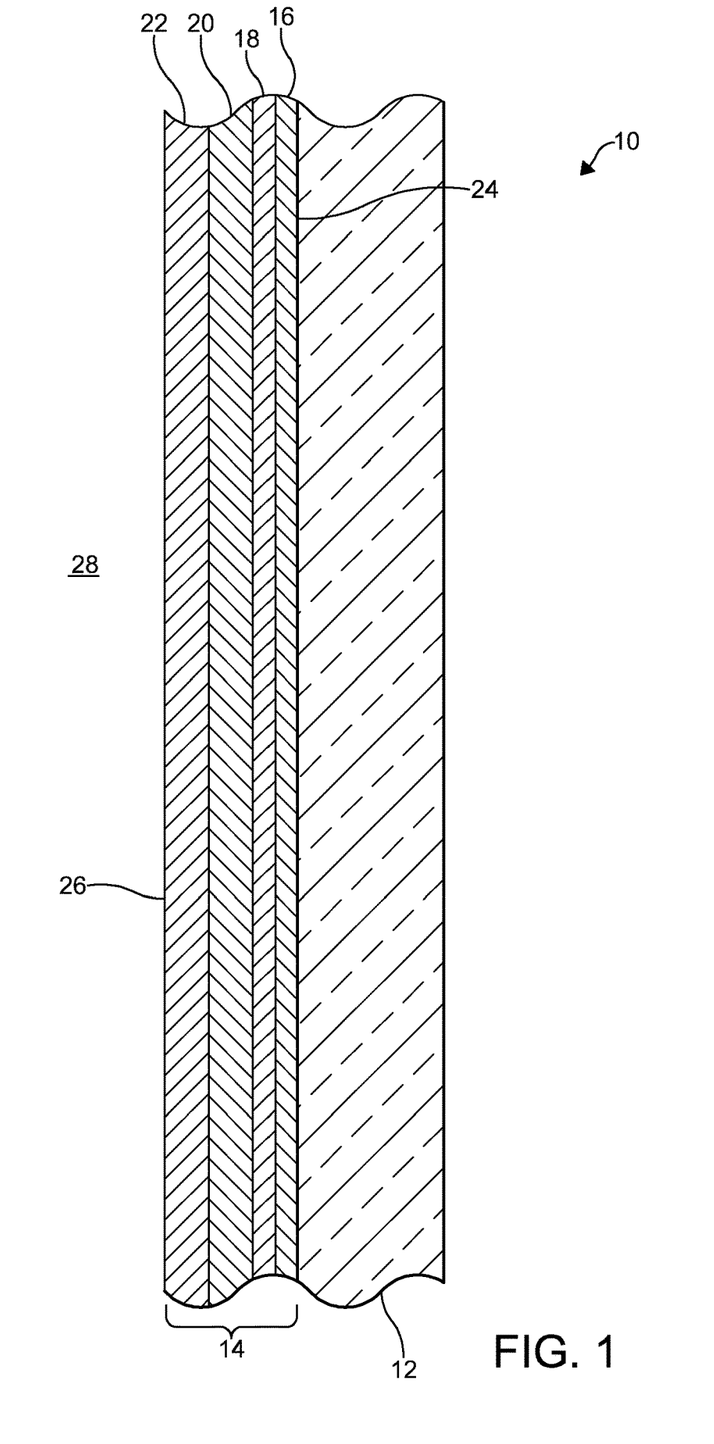
FIG. 1 is a sectional view of a coated glass article in accordance with the invention.

FIG. 1 illustrates certain embodiments of the coated glass article 10. As illustrated in FIG. 1, the coated glass article 10 comprises a glass substrate 12. The glass substrate 12 may be of any of the conventional glass compositions known in the art. In certain embodiments, the composition of the glass substrate 12 is selected to allow the coated glass article 10 to exhibit certain specific spectral properties. Preferably, the glass substrate 12 is a soda-lime-silica glass. In this embodiment, the substrate 12 may be a float glass ribbon. The glass substrate 12 may be substantially transparent to visible light. More preferably, the glass substrate 12 is clear and of a low-iron composition. However, the glass substrate may be of another composition such as, for example, a borosilicate composition. Also, the transparency or absorption characteristics of the glass substrate may vary between embodiments of the coated glass article. For example, a tinted glass substrate may be utilized in the coated glass article. Additionally, the glass substrate thickness may vary between embodiments.

A coating 14 is formed over and, preferably, directly on the glass substrate 12. The coating 14 comprises a first coating layer 16, a second coating layer 18, a third coating layer 20 and a fourth coating layer 22. In certain embodiments, the coating 14 consists of the aforementioned coating layers 16-22. The coating layers 16-22 may be deposited by any suitable method but are preferably deposited by atmospheric chemical vapor deposition (APCVD). Other known deposition methods are suitable for depositing one or more of the coating layers such as, for example, sol-gel coating techniques or sputter coating techniques. In embodiments where the substrate 12 is a float glass ribbon, the coating 14 is preferably applied in the heated zone of the float glass process.

The first coating layer 16 is deposited over and, preferably, directly on a major surface 24 of the glass substrate 12. In certain embodiments, the first coating layer 16 is a pyrolytic coating. Preferably, the first coating layer 16 has a refractive index which is greater than 1.6. More preferably, the first coating layer 16 has a refractive index which is about 1.8 or more. Also, for certain embodiments, it is preferred that the first coating layer 16 is of a material which has relatively high electrical resistance.

In certain embodiments, the first coating layer 16 is formed of an inorganic metal oxide. Preferably, in these embodiments, the first coating layer 16 is formed of tin oxide ($SnO_2$), titanium dioxide ($TiO_2$) or another suitable inorganic metal oxide. Tin oxide is a preferred material because of its relative high refractive index of about 1.8 or more and titanium dioxide is a preferred material because of its relative high refractive index of 2.2 or more. Also, tin oxide and titanium dioxide are preferred materials because of their relative high electrical resistance. Therefore, it should be appreciated that for these embodiments it is preferred that the electrical resistance of the first coating layer not be reduced by, for example, adding a dopant such as fluorine or another material to the first coating layer 16. As such, when the first coating layer 16 is tin oxide, it is preferred that the first coating layer 16 is undoped and comprises tin, oxygen, and possibly trace contaminants, for example of carbon and, when the first coating layer 16 is titanium dioxide, it is preferred that the first coating layer 16 is undoped and comprises titanium, oxygen, and possibly trace contaminants, for example of carbon.

In embodiments where the first coating layer 16 is tin oxide, the thickness of the first coating layer 16 is 30-50 nanometers (nm). More preferably, when the first coating layer 16 is tin oxide, the thickness of the first coating layer 16 is 35-45 nm. In embodiments where the first coating layer 16 is titanium dioxide, the thickness of the first coating layer 16 is 5-25 nm. More preferably, when the first coating layer 16 is titanium dioxide, the thickness of the first coating layer 16 is 15-20 nm. Preferably, in these embodiments, when the first coating layer 16 is an inorganic metal oxide layer of tin oxide, the refractive index is about 1.8 or more and, when the first coating layer 16 is an inorganic metal oxide layer of titanium dioxide, the refractive index is 2.2 or more. In certain embodiments, when the first coating layer 16 is an inorganic metal oxide layer of titanium dioxide, the first coating layer 16 has a refractive index of about 2.3 or more.

The second coating layer 18 is deposited over and, preferably, directly on the first coating layer 16. In certain embodiments, the second coating layer 18 is a pyrolytic coating. Preferably, the second coating layer 18 has a refractive index which is less than the refractive index of the first coating layer 16. In an embodiment, the second coating layer 18 has a refractive index which is less than 1.6 and, preferably, about 1.5 or less. Also, for certain embodiments, it is preferred that the second coating layer 18 has relatively high electrical resistance.

In an embodiment, the second coating layer 18 is formed of an inorganic metal oxide. Preferably, in this embodiment, the second coating layer 18 is formed, for example, of silicon dioxide ($SiO_2$). Silicon dioxide is a preferred material because of its refractive index of about 1.46. Also, silicon dioxide is a preferred material because of its relative high electrical resistance. When the second coating layer 18 is silicon dioxide, it is preferred that the second coating layer 18 comprises silicon, oxygen and possibly trace contaminants, for example of carbon.

In embodiments where the second coating layer 18 is an inorganic metal oxide layer of silicon dioxide, the thickness of the second coating layer 18 is 20-40 nm. More preferably, for these embodiments, the thickness of the second coating layer 18 is 25-40 nm.

The third coating layer 20 is deposited over and, preferably, directly on the second coating layer 18. In certain embodiments, the third coating layer 20 is a pyrolytic coating. Preferably, the third coating layer 20 has a refractive index which is relatively high such as, for example, 2.2 or more. Preferably, the refractive index of the third coating layer 20 is about 2.3 or more. The refractive index of the third coating layer 20 is greater than the refractive index of the second coating layer 18. Also, it is preferred that the third coating layer 20 has relatively high electrical resistance. As such, it is preferred that the third coating layer 20 is comprised of an inorganic metal oxide such as titanium dioxide or another suitable inorganic metal oxide.

It is preferred that the third coating layer 20 is deposited on the second coating layer 18 at a thickness of 30 nm or less. When the third coating layer 20 is comprised of an inorganic metal oxide, the third coating layer 20 is deposited on the second coating layer 18 at a thickness of 5 nm or more. In embodiments where the first coating layer 16 is tin oxide, the third coating layer 20 is preferably deposited at a thickness of 5-25 nm. More preferably, in these embodiments, the thickness of the third coating layer 20 is 10-20 nm. In embodiments where the first coating layer 16 is titanium dioxide, the third coating layer 20 is preferably deposited at a thickness of 10-30 nm. More preferably, in these embodiments, the thickness of the third coating layer 20 is 20-30 nm.

The fourth coating layer 22 is deposited over and, preferably, directly on the third coating layer 20. Preferably, the fourth coating layer 22 forms the outermost layer of the coating 14 and an outer surface 26 of the coated glass article 10. In certain embodiments, the fourth coating layer 22 is a pyrolytic coating.

The fourth coating layer 22 has a refractive index which is less than the refractive index of the third coating layer 20. Preferably, the refractive index of the fourth coating layer 22 is relatively low such as, for example, about 1.5 or less. Also, it is preferred that the fourth coating layer 22 has relatively high electrical resistance. As such, it is preferred that the fourth coating layer 22 is comprised of an inorganic metal oxide such as silicon dioxide or another suitable inorganic metal oxide.

In embodiments where the fourth coating layer 22 is comprised of an inorganic metal oxide the fourth inorganic metal oxide coating layer 22 is deposited on the third coating layer 20 at a thickness of 80 nm or more. In embodiments where the first coating layer 16 is tin oxide, the fourth coating layer 22 is preferably deposited at a thickness of 80-150 nm. More preferably, in these embodiments, the thickness of the fourth coating layer 22 is 90-110 nm and, most preferably, 90-105 nm. In embodiments where the first coating layer 16 is titanium dioxide, the fourth coating layer 22 is preferably deposited at a thickness of 80-150 nm. More preferably, in these embodiments, the thickness of the fourth coating layer 22 is 85-120 nm.

By carefully selecting the materials utilized to form the coating 14, the deposition order of the coating layers 16-22 and the thicknesses of the coating layers 16-22 as described above, it has been discovered that a coated glass article 10 exhibiting certain advantageous properties can be provided. For example, the embodiments of the coated glass article 10 advantageously exhibit anti-reflective properties such as low total visible light reflectance. For describing the coated glass article 10, total visible light reflectance refers to the percentage of visible light reflected from the coated glass article as measured from the side 28 of the article that has the coating deposited on the surface of the glass substrate. In an embodiment, the coated glass article 10 exhibits a total visible light reflectance of less than 6.5%. Preferably, the coated glass article 10 exhibits a total visible light reflectance of 6.0% or less. In another embodiment, the coated glass article 10 exhibits a total visible light reflectance of 5% or less.

Figure 2:
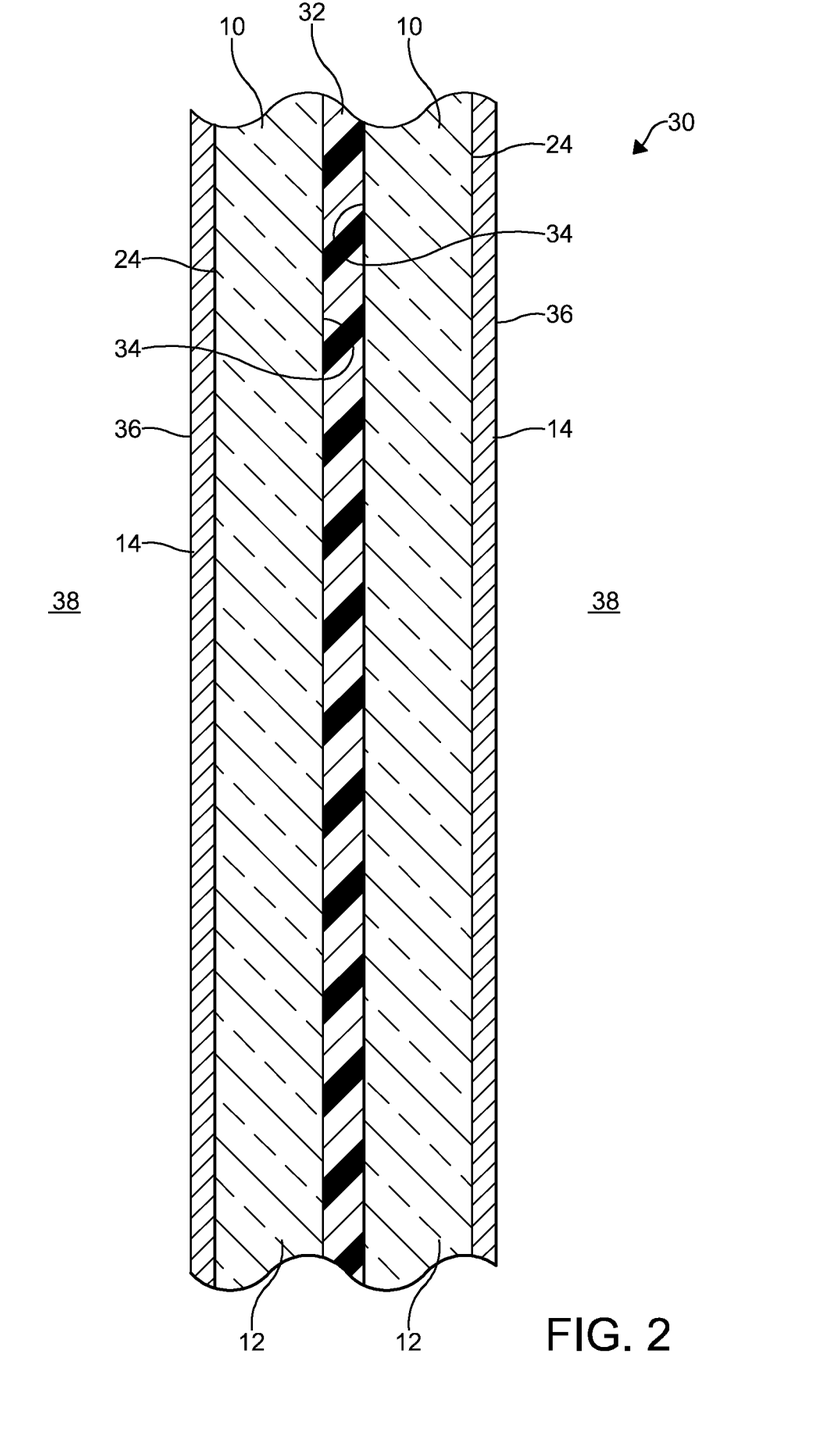
FIG. 2 is a sectional view of a laminated glass unit in accordance with the invention.

The coated glass article 10 also exhibits a high sheet resistance of, for example, greater than $1.0 \times 10^5$ ohm/sq. Preferably, the coated glass article 10 exhibits a sheet resistance of $1.0 \times 10^7$ ohm/sq. or more. The coated glass article 10 may also exhibit other properties which in certain applications are advantageous. For example, it should also be noted that the coated glass article 10 not only exhibits a reduced total visible light reflectance but may also exhibit a neutral reflected color for the visible light reflected from the coated side 28 of the article when viewed at a 90 degree angle incident from the article. For the purpose of describing the embodiments 10, 30 disclosed herein, a neutral color for the light reflected or transmitted is defined under the CIELAB color scale system with an a* value in the range of 6 to −6 and a b* value in the range of 6 to −6. It should also be noted that, for certain embodiments or applications described herein, a non-neutral reflected and/or transmitted color may be desirable and can be exhibited by the coated glass article.

Also, the coated glass article 10 may exhibit a high total visible light transmittance. For describing the coated glass article, total visible light transmittance refers to the percentage of visible light which passes through the article as measured from the side of the article that has the coating deposited on the surface of the glass substrate. In certain embodiments, the coated glass article 10 exhibits a total visible light transmittance of 92% (Illuminant C) or more. More preferably, the total visible light transmittance of the coated glass article 10 is 94% (Illuminant C) or more. In still other embodiments, the coated glass article 10 exhibits haze below 1%. Preferably, the coated glass article 10 exhibits haze of 0.5% or less. More preferably, the coated glass article 10 exhibits haze of 0.35% or less.

Referring now to FIG. 2, in certain embodiments, separate coated glass articles 10 are utilized together to form a laminated glass unit 30. Preferably, in these embodiments, the coated glass articles 10 are in a parallel relationship with each other.

The laminated glass unit 30 also comprises a polymeric interlayer 32 provided between the coated glass articles 10. The interlayer 32 can be formed of any suitable polymeric material. Preferably, such suitable polymeric materials will, when properly heated and pressed between the coated glass articles 10, be virtually transparent. Examples of such suitable polymeric materials are polyvinyl butyral and polyvinyl chloride. Optionally, the polymeric interlayer may be coated or otherwise treated so that it exhibits solar control properties.

The polymeric interlayer 32 separates the coated glass articles 10 from each other. Further, each coated glass article 10 comprises a major surface 34 which is adhesively bonded and in contact with the polymeric interlayer 32. Upon exposure to suitable temperature and pressure conditions, the polymeric interlayer 32 is adhesively bonded to a major surface 34 of each coated glass article 10 which bonds the articles together.

For the embodiments of the laminated glass unit 30, the coating 14 is deposited over at least one major surface 24 of each of the coated glass articles 10. It is preferred that the major surface 34 of each of the coated glass article 10 that is adhesively bonded and in contact with the polymeric interlayer 32 is not covered by the coating 14. The unbonded major surface, which preferably has the coating 14 deposited thereon, of each of the coated glass articles 10 faces out from the laminated glass unit 30.

Advantageously the laminated glass unit 30 exhibits anti-reflective properties such as low total visible light reflectance. For describing the laminated glass unit 30, total visible light reflectance refers to the percentage of visible light reflected from a side 38 of the laminated glass unit. In an embodiment, the laminated glass unit 30 exhibits a total visible light reflectance of 2.5% or less. Preferably, the laminated glass unit 30 exhibits a total visible light reflectance of 2% or less. More preferably, the laminated glass unit 30 exhibits a total visible light reflectance of 1.5% or less. Even more preferably, the laminated glass unit 30 exhibits a total visible light reflectance of 1.0% or less.

The laminated glass unit 30 may also exhibit other properties which, in certain applications, are advantageous. For example, due to the presence of the coatings 14 at the unbonded surfaces 24 of the coated glass articles 10, the outer surfaces 36 of the laminated glass unit 30 exhibit a high sheet resistance of, for example, greater than $1.0 \times 10^5$ ohm/sq.

Preferably, the outer surfaces 36 of the laminated glass unit 30 exhibit a sheet resistance of $1.0 \times 10^7$ ohm/sq. or more. Additionally, the laminated glass unit 30 may exhibit a neutral reflected color for the visible light reflected from and/or transmitted through the unit when viewed at a 90 degree angle incident from a side 38 the unit 30. It should also be noted that, for certain embodiments or applications described herein, a non-neutral reflected and/or transmitted color may be desirable and can be exhibited by the laminated glass unit 30.

Also, the laminated glass unit 30 exhibits a high total visible light transmittance. For describing the laminated glass unit 30, total visible light transmittance refers to the percentage of visible light which passes through the unit. In certain embodiments, the total visible light transmittance of the laminated glass unit 30 is 95% (Illuminant C) or more. Preferably, the laminated glass unit 30 exhibits a visible light transmittance of 96% (Illuminant C) or more. More preferably, the laminated glass unit 30 exhibits a visible light transmittance of 97% (Illuminant C) or more.

The laminated glass unit 30 may be utilized in a glazing and/or in the applications described above for the coated glass article or in another suitable application.

EXAMPLES

The following examples are presented solely for the purpose of further illustrating and disclosing the embodiments of the coated glass article and laminated glass unit.

Examples of coated glass articles within the scope of the invention are described below and illustrated in TABLEs 1-8.

In TABLE 1, TABLE 2, TABLE 3 and TABLE 4, the coated glass articles within the scope of the invention are Ex 1-Ex 27.

The following experimental conditions are applicable to Ex 1-Ex 27. For Ex 1-Ex 27, a coating was deposited on a deposition surface of a glass substrate as the glass substrate was being formed and moving in conjunction with the float glass manufacturing process. The glass substrate was of a soda-lime-silica composition. For Ex 1-Ex 2 and Ex 14-Ex 27, the thickness of the glass substrate was 6 mm. For Ex 3-Ex 13, the thickness of the glass substrate was 4 mm. The coating was formed by depositing a first coating layer, second coating layer, third coating layer and fourth coating layer. Each coating layer was formed by utilizing an APCVD process.

For Ex 1, the first coating layer was an inorganic metal oxide layer of pyrolytic tin oxide. The tin oxide coating layer was deposited at a thickness of about 39 nm on the glass substrate. After depositing the first coating layer, the second coating layer was deposited. The second coating layer was an inorganic metal oxide layer of pyrolytic silicon dioxide. The silicon dioxide coating layer was deposited at a thickness of about 33 nm on the first coating layer. After depositing the second coating layer, the third coating layer was deposited. The third coating layer was an inorganic metal oxide layer of pyrolytic titanium dioxide. The titanium dioxide coating layer was deposited at a thickness of about 14 nm on the second coating layer. After depositing the third coating layer, the fourth coating layer was deposited. The fourth coating layer was an inorganic metal oxide layer of pyrolytic silicon dioxide. The silicon dioxide coating layer was deposited at a thickness of about 94 nm on the third coating layer.

For Ex 2, the first coating layer was an inorganic metal oxide layer of pyrolytic tin oxide. The tin oxide coating layer was deposited at a thickness of about 42 nm on the glass substrate. After depositing the first coating layer, the second coating layer was deposited. The second coating layer was an inorganic metal oxide layer of pyrolytic silicon dioxide. The silicon dioxide coating layer was deposited at a thickness of about 29 nm on the tin oxide coating layer. After depositing the second coating layer, the third coating layer was deposited. The third coating layer was an inorganic metal oxide layer of pyrolytic titanium dioxide. The titanium dioxide coating layer was deposited at a thickness of about 17 nm on the silicon dioxide coating layer. After depositing the third coating layer, the fourth coating layer was deposited. The fourth coating layer was an inorganic metal oxide layer of pyrolytic silicon dioxide. The silicon dioxide coating layer was deposited at a thickness of about 96 nm on the third coating layer.

Thus, the coated glass articles of Ex 1 and Ex 2 are of a glass/$SnO_2$/$SiO_2$/$TiO_2$/$SiO_2$ arrangement. The thicknesses of the coating layers of Ex 1 and Ex 2 are reported in TABLE 1 in nanometers and were calculated via optical modeling. The haze, sheet resistance ($R_s$), total visible light reflectance (Rf), reflected color (Ra*, Rb*) and total visible light transmittance (Tvis) of the coated glass articles of Ex 1 and Ex 2 are also reported in TABLE 1. The haze was measured on the coating side of the coated glass articles of Ex 1 and Ex 2 using a Haze-Gard Plus made by BYK-Gardner and is expressed as a percentage. The total visible light reflectance and reflected color were measured on the coating side of the coated glass article using a spectrophotometer. The total visible light reflectance is expressed as a percentage. The total visible light transmittance was also measured using a spectrophotometer and is expressed as a percentage. The sheet resistance was measured using a resistivity test fixture and is expressed in ohm/sq.

TABLE 1

| Examples | $SnO_2$ | $SiO_2$ | $TiO_2$ | $SiO_2$ | Haze | $R_s$ | Rf | Ra* | Rb* | Tvis |
| --- | --- | --- | --- | --- | --- | --- | --- | --- | --- | --- |
| Ex 1 | 39 | 33 | 14 | 94 | 0.31 | $6.77 \times 10^9$ | 5.85 | 0.63 | −2.49 | 93.31 |
| Ex 2 | 42 | 29 | 17 | 96 | 0.79 | $8.78 \times 10^7$ | 5.98 | −1.50 | −3.74 | 92.65 |

As shown in TABLE 1, the coated glass articles of Ex1 and Ex 2 exhibit anti-reflective properties. For example, the coated glass articles of Ex 1 and Ex 2 exhibited a visible light reflectance from the coated side of the glass substrate of less than 6%. By comparison, the visible light reflectance from an uncoated glass substrate having a soda-lime-silica composition is typically about 7-8%.

Also, the coated glass articles of Ex 1 and Ex 2 exhibited other properties which are advantageous. For example, the coated glass articles of Ex 1 and Ex 2 exhibited sheet resistances of greater than $1.0 \times 10^7$ ohm/sq. Specifically, the sheet resistances of the coated glass articles of Ex 1 and Ex 2 were $6.77 \times 10^9$ and $8.78 \times 10^7$, respectively. High sheet resistance is advantageous when, for example, the coated glass article is utilized in certain electronic device applications.

Also, for Ex 1 and Ex 2, the coated glass articles exhibited haze below 1%, visible light transmittance above 92% (Illuminant C) and a neutral color in reflection.

The coated glass articles of Ex 3-Ex 27 are also of a glass/$SnO_2$/$SiO_2$/$TiO_2$/$SiO_2$ arrangement. The total visible light reflectance (Rf), reflected color (Ra*, Rb*) and total visible light transmittance (Tvis) of the coated glass articles of Ex 3-Ex 27 are reported in TABLE 2, TABLE 3 and TABLE 4. The total visible light reflectance and reflected color were measured on the coating side of the coated glass article using a spectrophotometer. The total visible light reflectance is expressed as a percentage. The total visible light transmittance was also measured using a spectrophotometer and is expressed as a percentage. Also, the haze exhibited by the coated glass articles of Ex 19-Ex 27 is reported in TABLE 4. The haze of each of the coated glass articles of Ex 19-Ex 27 was measured on the coating side of the coated glass article using a Haze-Gard Plus made by BYK-Gardner and is expressed as a percentage.

TABLE 2

| Examples | Rf | Ra* | Rb* | Tvis |
|---|---|---|---|---|
| Ex 3 | 5.8 | −0.3 | −0.9 | 93.5 |
| Ex 4 | 5.8 | 0.9 | −1.8 | 93.4 |
| Ex 5 | 5.8 | 0.9 | −1.9 | 93.1 |
| Ex 6 | 5.7 | −1.7 | −1.3 | 93.5 |
| Ex 7 | 5.6 | −1.8 | −1.6 | 93.6 |
| Ex 8 | 5.7 | −1.5 | −2.5 | 93.5 |
| Ex 9 | 5.5 | −0.40 | −3.5 | 93.8 |
| Ex 10 | 5.5 | 0.8 | −3.0 | 93.7 |
| Ex 11 | 5.3 | 1.5 | −3.8 | 94.0 |
| Ex 12 | 5.3 | 2.3 | −2.7 | 93.9 |
| Ex 13 | 5.4 | 2.0 | −4.2 | 93.8 |

As shown in TABLE 2, the coated glass articles of Ex 3-Ex 13 exhibit anti-reflective properties. For example, the coated glass articles of Ex 3-Ex 13 exhibited a visible light reflectance from the coated side of the glass substrate of less than 6.0%. Also, the coated glass articles of Ex 3-Ex 13 exhibited other properties which are advantageous. For example, for Ex 3-Ex 13, the coated glass articles exhibited visible light transmittance above 93% (Illuminant C) and a neutral color in reflection.

TABLE 3

| Examples | Rf | Ra* | Rb* | Tvis |
|---|---|---|---|---|
| Ex 14 | 6.2 | 4.3 | −1.6 | 92.9 |
| Ex 15 | 6.0 | 1.8 | −3.6 | 93.1 |
| Ex 16 | 5.9 | 0.6 | −2.5 | 93.3 |
| Ex 17 | 6.4 | −2.1 | −4.8 | 92.5 |
| Ex 18 | 6.0 | −1.5 | −3.7 | 92.7 |

As shown in TABLE 3, the coated glass articles of Ex 14-Ex 18 exhibit anti-reflective properties. For example, the coated glass articles of Ex 14-Ex 18 exhibited a visible light reflectance from the coated side of the glass substrate of less than 6.5%. Also, the coated glass articles of Ex 14-Ex 18 exhibited other properties which are advantageous. For example, for Ex 14-Ex 18, the coated glass articles exhibited visible light transmittance above 92% (Illuminant C) and a neutral color in reflection.

TABLE 4

| Examples | Rf | Ra* | Rb* | Tvis | Haze |
|---|---|---|---|---|---|
| Ex 19 | 5.16 | −2.18 | −1.31 | 93.23 | 0.35 |
| Ex 20 | 4.76 | −1.96 | 93.83 | 0.23 | |
| Ex 21 | 4.87 | 1.69 | −1.49 | 93.80 | 0.23 |
| Ex 22 | 4.85 | 1.66 | −1.40 | 93.87 | 0.25 |
| Ex 23 | 4.92 | 1.22 | −2.91 | 93.83 | 0.24 |
| Ex 24 | 5.00 | 1.07 | −1.84 | 93.70 | 0.24 |
| Ex 25 | 5.01 | 1.01 | −2.20 | 93.73 | 0.26 |
| Ex 26 | 5.04 | 1.01 | −2.74 | 93.73 | 0.22 |
| Ex 27 | 5.12 | 3.12 | −1.66 | 93.63 | 0.21 |

As shown in TABLE 4, the coated glass articles of Ex 19-Ex 27 exhibit anti-reflective properties. For example, the coated glass articles of Ex 19-Ex 27 exhibited a visible light reflectance from the coated side of the glass substrate of 6.0% or less. Also, Ex 20-Ex 24 exhibited a visible light reflectance from the coated side of the glass substrate of 5.0% or less. Additionally, each of the coated glass articles of Ex 19-Ex 27 exhibited haze of 0.5% or less. In fact, each of the coated glass articles of Ex 19-Ex 27 exhibited haze of 0.35% or less. The coated glass articles of Ex 19-Ex 27 exhibited other advantageous properties. For example, for Ex 14-Ex 18, the coated glass articles exhibited visible light transmittance above 93% (Illuminant C) and a neutral color in reflection.

An example of a laminated glass unit within the scope of the invention is described below and illustrated in TABLE 5. In TABLE 5, the laminated glass unit within the scope of the invention is Ex 28.

For Ex 28, the laminated glass unit was formed from two coated glass articles. Each coated glass article comprised a glass substrate having a thickness of 3.2 mm and of a soda-lime-silica composition. The glass substrates were formed in conjunction with the float glass manufacturing process. A coating was deposited on one major surface of each of the glass substrates. The coating was formed by depositing a first coating layer, second coating layer, third coating layer and fourth coating layer. Each coating layer was formed by utilizing an APCVD process.

For Ex 28, the first coating layer was an inorganic metal oxide layer of pyrolytic tin oxide. The tin oxide coating layer was deposited at a thickness of about 40 nm on the glass substrate. After depositing the first coating layer, the second coating layer was deposited.

The second coating layer was an inorganic metal oxide layer of pyrolytic silicon dioxide. The silicon dioxide coating layer was deposited at a thickness of about 35 nm on the first coating layer. After depositing the second coating layer, the third coating layer was deposited. The third coating layer was an inorganic metal oxide layer of pyrolytic titanium dioxide. The titanium dioxide coating layer was deposited at a thickness of about 15 nm on the second coating layer. After depositing the third coating layer, the fourth coating layer was deposited. The fourth coating layer was an inorganic metal oxide layer of pyrolytic silicon dioxide. The silicon dioxide coating layer was deposited at a thickness of about 95 nm on the third coating layer.

Subsequent to cooling the coated glass substrates to room temperature, a polymeric interlayer of polyvinyl butyral having a thickness of 0.76 mm was placed between the two glass articles. The interlayer was in contact with the uncoated major surfaces of each coated glass article. Thus, the coatings are provided on the unbonded major surfaces of each coated glass article and form outer surfaces of the laminated glass unit.

The coated glass articles and the polymeric interlayer were subjected to sufficient temperature and pressure to cause the interlayer to adhesively bond to each glass substrate, and the glass substrates to be bonded one to the other, thus forming the laminated glass unit. When so treated, the interlayer became essentially transparent.

The total visible light transmittance (Tvis), transmitted color (Ta*, Tb*), total visible light reflectance (Rf) and reflected color (Ra*, Rb*) of the laminated glass unit of Ex 28 are reported in TABLE 5. The total visible light transmittance, total visible light reflectance and reflected color were measured as described above. The transmitted color was measured using a spectrophotometer. The total visible light reflectance and the total visible light transmittance are expressed as percentages.

TABLE 5

| Example | Tvis | Ta* | Tb* | Rf | Ra* | Rb* |
| --- | --- | --- | --- | --- | --- | --- |
| Ex 28 | 96.4 | −0.9 | 2.7 | 1.3 | −1.7 | −12.6 |

As can be seen from TABLE 5, the laminated glass unit designated as Ex 28 has a low visible light reflectance of less than 1.5% and between 1% and 1.5% and high visible light transmittance of between 95% and 97%. Also, the laminated glass unit of Ex 28 provides a neutral color in transmission.

Additional examples of laminated glass units within the scope of the invention are described below and illustrated in TABLE 6. In TABLE 6, the laminated glass units within the scope of the invention are Ex 29-Ex 39.

The laminated glass units of Ex 29-Ex 39 were formed from two coated glass articles. The laminated glass unit of Ex 29 included two coated glass articles of Ex 3 with an interlayer of polyvinyl butyral between the two coated glass articles. The interlayer is in contact with the uncoated surfaces of each glass substrate. The laminated glass unit of Ex 30 included two coated glass articles of Ex 4 with an interlayer of polyvinyl butyral between the two coated glass articles. The interlayer is in contact with the uncoated surfaces of each glass substrate. The laminated glass unit of Ex 31 included two coated glass articles of Ex 5 with an interlayer of polyvinyl butyral between the two coated glass articles. The interlayer is in contact with the uncoated surfaces of each glass substrate. The laminated glass unit of Ex 32 included two coated glass articles of Ex 6 with an interlayer of polyvinyl butyral between the two coated glass articles. The interlayer is in contact with the uncoated surfaces of each glass substrate. The laminated glass unit of Ex 33 included two coated glass articles of Ex 7 with an interlayer of polyvinyl butyral between the two coated glass articles. The interlayer is in contact with the uncoated surfaces of each glass substrate. The laminated glass unit of Ex 34 included two coated glass articles of Ex 8 with an interlayer of polyvinyl butyral between the two coated glass articles. The interlayer is in contact with the uncoated surfaces of each glass substrate. The laminated glass unit of Ex 35 included two coated glass articles of Ex 9 with an interlayer of polyvinyl butyral between the two coated glass articles. The interlayer is in contact with the uncoated surfaces of each glass substrate. The laminated glass unit of Ex 36 included two coated glass articles of Ex 10 with an interlayer of polyvinyl butyral between the two coated glass articles. The interlayer is in contact with the uncoated surfaces of each glass substrate. The laminated glass unit of Ex 37 included two coated glass articles of Ex 11 with an interlayer of polyvinyl butyral between the two coated glass articles. The interlayer is in contact with the uncoated surfaces of each glass substrate. The laminated glass unit of Ex 38 included two coated glass articles of Ex 12 with an interlayer of polyvinyl butyral between the two coated glass articles. The interlayer is in contact with the uncoated surfaces of each glass substrate. The laminated glass unit of Ex 39 included two coated glass articles of Ex 13 with an interlayer of polyvinyl butyral between the two coated glass articles. The interlayer is in contact with the uncoated surfaces of each glass substrate.

To form the laminated glass units of Ex 29-Ex 39, the coated glass articles of Ex 3-Ex 18 and the polymeric interlayers were subjected to sufficient temperature and pressure to bond. When so treated, the interlayers became essentially transparent. The coatings of each of the laminated glass units of Ex 29-Ex 39 are provided on the unbonded major surfaces of each coated glass article and form outer surfaces of the units.

The total visible light transmittance (Tvis), transmitted color (Ta*, Tb*), total visible light reflectance (Rf) and reflected color (Ra*, Rb*) of the laminated glass units of Ex 29-Ex 39 are reported in TABLE 6. The total visible light transmittance, total visible light reflectance and reflected color were measured as described above. The transmitted color was measured using a spectrophotometer. The total visible light reflectance and the total visible light transmittance are expressed as percentages.

TABLE 6

| Examples | Tvis | Ta* | Tb* | Rf | Ra* | Rb* |
| --- | --- | --- | --- | --- | --- | --- |
| Ex 29 | 95.7 | −0.9 | 2.3 | 2.4 | −0.7 | −1.9 |
| Ex 30 | 95.6 | −1.2 | 2.6 | 2.5 | 2.4 | −4.7 |
| Ex 31 | 95.8 | −1.2 | 2.4 | 2.4 | 3.2 | −5.4 |
| Ex 32 | 95.7 | −0.4 | 2.2 | 2.5 | −6.9 | −3.4 |
| Ex 33 | 95.9 | −0.5 | 2.4 | 2.2 | −5.7 | −4.5 |
| Ex 34 | 95.8 | −0.6 | 2.6 | 2.2 | −4.1 | −7.3 |
| Ex 35 | 96.4 | −0.9 | 2.7 | 1.8 | −1.0 | −10.7 |
| Ex 36 | 96.4 | −1.2 | 2.7 | 1.9 | 3.7 | −10.8 |
| Ex 37 | 97.0 | −1.4 | 2.9 | 1.5 | 6.2 | −12.9 |
| Ex 38 | 96.9 | −1.6 | 2.6 | 1.6 | 10.1 | −10.4 |
| Ex 39 | 96.9 | −1.7 | 2.7 | 1.6 | 10.7 | −11.8 |

As can be seen from TABLE 6, the laminated glass units of Ex 29-Ex 39 have low visible light reflectance of 2.5% or less and high visible light transmittance of between 95% and 97%. Also, for Ex 35-Ex 39, the laminated glass units exhibited a visible light reflectance of 2.0% or less. Further, the laminated glass units of Ex 29-Ex 39 provide a neutral color in transmission.

Additional examples of coated glass articles within the scope of the invention are described below and illustrated in TABLE 7. In TABLE 7, coated glass articles within the scope of the invention are Ex 40-Ex 51.

The coated glass articles of Ex 40-Ex 51 are predictive and were modeled utilizing input parameters similar to those reported for Ex 1 and Ex 2. Each of the coated glass articles of Ex 40-Ex 51 comprised a glass substrate. Each glass substrate had a thickness of 4 mm and a low iron soda-lime-silica composition. Each of the coated glass articles of Ex 40-Ex 51 also comprised a coating deposited on a deposition surface of the glass substrate. Each coating comprised a first coating layer, second coating layer, third coating layer and fourth coating layer.

For each of the of the coated glass articles of Ex 40-Ex 51, the first coating layer is deposited on the glass substrate and is an inorganic metal oxide layer of titanium dioxide. The thicknesses of the first coating layers are as reported in TABLE 7. The second coating layer is deposited on the first coating layer and is an inorganic metal oxide layer of silicon dioxide. The thicknesses of the second coating layers are as reported in TABLE 7. The third coating layer is deposited on the second coating layer and is an inorganic metal oxide layer of titanium dioxide. The thicknesses of the third coating layers are as reported in TABLE 7. The fourth coating layer is deposited on the third coating layer and is an inorganic metal oxide layer of silicon dioxide. The thicknesses of the fourth coating layers are as reported in TABLE 7.

Thus, the coated glass articles of Ex 40-Ex 51 are of a glass/$TiO_2$/$SiO_2$/$TiO_2$/$SiO_2$ arrangement. The thicknesses of the coating layers of Ex 40-Ex 51 are reported in TABLE 7 in nanometers. The total visible light reflectance (Rf), reflected color (Ra*, Rb*) and total visible light transmittance (Tvis) of the coated glass articles of Ex 40-Ex 51 are also reported in TABLE 7. The total visible light reflectance, reflected color and total visible light transmittance of the coated glass articles of Ex 40-Ex 51 were calculated by optical modeling. The total visible light reflectance and reflected color are reported for the coating side of the coated glass article. The total visible light reflectance and the total visible light transmittance are expressed as percentages.

TABLE 7

| Examples | $TiO_2$ | $SiO_2$ | $TiO_2$ | $SiO_2$ | Rf | Ra* | Rb* | Tvis |
|---|---|---|---|---|---|---|---|---|
| Ex 40 | 18 | 35 | 25 | 94.5 | 4.6 | 4.24 | −0.47 | 94.6 |
| Ex 41 | 18 | 35 | 25 | 105.0 | 4.9 | −0.59 | −0.94 | 94.6 |
| Ex 42 | 18 | 35 | 25 | 115.5 | 5.7 | −4.22 | −2.04 | 93.7 |
| Ex 43 | 18 | 31.5 | 25 | 105 | 5.2 | −0.72 | −1.84 | 94.2 |
| Ex 44 | 18 | 35.0 | 25 | 105 | 4.9 | −0.59 | −0.94 | 94.6 |
| Ex 45 | 18 | 38.5 | 25 | 105 | 4.6 | 0.22 | −2.00 | 94.8 |
| Ex 46 | 18 | 35 | 22.5 | 105 | 5.0 | −1.71 | −1.98 | 94.4 |
| Ex 47 | 18 | 35 | 25.0 | 105 | 4.9 | −0.59 | −0.94 | 94.6 |
| Ex 48 | 18 | 35 | 27.5 | 105 | 4.8 | 1.28 | −1.98 | 94.6 |
| Ex 49 | 16.2 | 35 | 25 | 105 | 4.9 | 0.97 | −1.69 | 94.5 |
| Ex 50 | 18.0 | 35 | 25 | 105 | 4.9 | −0.59 | −0.94 | 94.6 |
| Ex 51 | 19.8 | 35 | 25 | 105 | 4.9 | −1.95 | −0.86 | 94.5 |

As shown in TABLE 7, the coated glass articles of Ex 40-Ex 51 exhibit anti-reflective properties. As illustrated by the coated glass articles of Ex 40-Ex 51 exhibited a visible light reflectance from the coated side of the glass substrate of less than 6%. Additionally, the coated glass articles of Ex 40-Ex 51 and Ex 44-Ex 51 exhibited a visible light reflectance from the coated side of the glass substrate of 5.0% or less.

Also, the coated glass articles of Ex 40-Ex 51 exhibit other properties which are advantageous. For Ex 40-Ex 51, the coated glass articles exhibited visible light transmittance above 93% (Illuminant C) and a neutral color in reflection. It is also expected that the sheet resistances of the coated glass articles of Ex 40-Ex 51 would be $1.0 \times 10^7$ ohm/sq. or more.

Additional examples of laminated glass units within the scope of the invention are described below and illustrated in TABLE 8. In TABLE 8, the laminated glass units within the scope of the invention are Ex 52-Ex 63.

The laminated glass units of Ex 52-Ex 63 are predictive and were modeled utilizing input parameters from the coated glass articles of Ex 40-Ex 51. The laminated glass unit of Ex 52 included two coated glass articles of Ex 40 with an interlayer of polyvinyl butyral between the two coated glass articles. The interlayer is in contact with the uncoated surfaces of each glass substrate. The laminated glass unit of Ex 53 included two coated glass articles of Ex 41 with an interlayer of polyvinyl butyral between the two coated glass articles. The interlayer is in contact with the uncoated surfaces of each glass substrate. The laminated glass unit of Ex 54 included two coated glass articles of Ex 42 with an interlayer of polyvinyl butyral between the two coated glass articles. The interlayer is in contact with the uncoated surfaces of each glass substrate. The laminated glass unit of Ex 55 included two coated glass articles of Ex 43 with an interlayer of polyvinyl butyral between the two coated glass articles. The interlayer is in contact with the uncoated surfaces of each glass substrate. The laminated glass unit of Ex 56 included two coated glass articles of Ex 44 with an interlayer of polyvinyl butyral between the two coated glass articles. The interlayer is in contact with the uncoated surfaces of each glass substrate. The laminated glass unit of Ex 57 included two coated glass articles of Ex 45 with an interlayer of polyvinyl butyral between the two coated glass articles. The interlayer is in contact with the uncoated surfaces of each glass substrate. The laminated glass unit of Ex 58 included two coated glass articles of Ex 46 with an interlayer of polyvinyl butyral between the two coated glass articles. The interlayer is in contact with the uncoated surfaces of each glass substrate. The laminated glass unit of Ex 59 included two coated glass articles of Ex 47 with an interlayer of polyvinyl butyral between the two coated glass articles. The interlayer is in contact with the uncoated surfaces of each glass substrate. The laminated glass unit of Ex 60 included two coated glass articles of Ex 48 with an interlayer of polyvinyl butyral between the two coated glass articles. The interlayer is in contact with the uncoated surfaces of each glass substrate. The laminated glass unit of Ex 61 included two coated glass articles of Ex 49 with an interlayer of polyvinyl butyral between the two coated glass articles. The interlayer is in contact with the uncoated surfaces of each glass substrate. The laminated glass unit of Ex 62 included two coated glass articles of Ex 50 with an interlayer of polyvinyl butyral between the two coated glass articles. The interlayer is in contact with the uncoated surfaces of each glass substrate. The laminated glass unit of Ex 63 included two coated glass articles of Ex 51 with an interlayer of polyvinyl butyral between the two coated glass articles. The interlayer is in contact with the uncoated surfaces of each glass substrate.

The coatings of each of the laminated glass units of Ex 52-Ex 63 are provided on the unbonded major surfaces of each coated glass article and form outer surfaces of the units.

The total visible light transmittance (Tvis), transmitted color (Ta*, Tb*), total visible light reflectance (Rf) and reflected color (Ra*, Rb*) of the laminated glass units of Ex 52-Ex 63 are reported in TABLE 8. The total visible light transmittance, transmitted color, total visible light reflectance and reflected color for the laminated glass units of Ex 52-Ex 63 were calculated by optical modeling. The total visible light reflectance and reflected color are reported for the coating side of the coated glass article. The total visible light transmittance and total visible light reflectance are expressed as percentages.

TABLE 8

| Examples | Tvis | Ta* | Tb* | Rf | Ra* | Rb* |
|---|---|---|---|---|---|---|
| Ex 43 | 98.1 | −1.80 | −0.04 | 0.89 | 24.00 | 1.56 |
| Ex 44 | 97.90 | −0.39 | 0.06 | 0.97 | −2.52 | −1.32 |
| Ex 45 | 97.10 | −0.56 | 0.19 | 1.74 | 0.40 | −2.20 |
| Ex 46 | 97.10 | −0.31 | 0.33 | 1.80 | −2.40 | −4.70 |
| Ex 47 | 97.90 | −0.39 | 0.06 | 0.97 | −2.52 | −1.32 |

TABLE 8-continued

| Examples | Tvis | Ta* | Tb* | Rf | Ra* | Rb* |
|---|---|---|---|---|---|---|
| Ex 48 | 98.40 | −0.67 | 0.40 | 0.50 | 2.57 | −8.00 |
| Ex 49 | 97.63 | −0.03 | 0.33 | 1.24 | −8.27 | −6.19 |
| Ex 50 | 97.90 | −0.39 | 0.06 | 0.97 | −2.52 | −1.32 |
| Ex 51 | 98.10 | −0.97 | 0.43 | 0.79 | 9.00 | −7.10 |
| Ex 52 | 97.80 | −0.43 | 0.17 | 1.07 | −1.92 | −2.98 |
| Ex 53 | 97.90 | −0.39 | 0.06 | 0.97 | −2.52 | −1.32 |
| Ex 54 | 97.70 | −0.02 | 0.05 | 1.13 | −10.60 | −0.90 |

As can be seen from TABLE 8, the laminated glass units designated as Ex 52-Ex 63 had a low reflectance of 2.0% or less and high transmittance of 97% or more. Also, the laminated glass units of Ex 52-Ex 63 provide a neutral color in transmission and, in certain embodiments, reflection.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention.

The invention claimed is:

1. A coated glass article comprising:
a glass substrate; and
a coating formed over the glass substrate, wherein the coating comprises:
 a first inorganic metal oxide layer comprising titanium dioxide and deposited over a major surface of the glass substrate, wherein the first inorganic metal oxide layer is a pyrolytic coating deposited at a thickness of 5-25 nm and has a refractive index of 1.6 or more,
 a second inorganic metal oxide layer comprising silicon dioxide and deposited over the first inorganic metal oxide layer at a thickness of 20-40 nm, wherein the second inorganic metal oxide layer has a refractive index which is less than the refractive index of the first inorganic metal oxide layer,
 a third inorganic metal oxide layer comprising titanium dioxide and deposited over the second inorganic metal oxide layer at a thickness of 30 nm or less, wherein the third inorganic metal oxide layer has a refractive index of 2.2 or more and wherein the refractive index of the third inorganic metal oxide layer is greater than the refractive index of the second inorganic metal oxide layer, and
 a fourth inorganic metal oxide layer comprising silicon dioxide and deposited over the third inorganic metal oxide layer at a thickness of 80 nm or more, wherein the fourth inorganic metal oxide layer has a refractive index which is less than the refractive index of the third inorganic metal oxide layer;
wherein the coated glass article exhibits a total visible light reflectance of less than 6.5%.

2. The coated glass article of claim 1, wherein the first inorganic metal oxide layer is deposited on the major surface of the glass substrate and the second inorganic metal oxide layer is deposited on the first inorganic metal oxide layer and has a refractive index which is less than 1.6.

3. The coated glass article of claim 1, wherein the third inorganic metal oxide is deposited on the second inorganic metal oxide layer.

4. The coated glass article of claim 1, wherein the fourth inorganic metal oxide layer is deposited on the third inorganic metal oxide layer and has a refractive index of 1.5 or less.

5. The coated glass article of claim 1, wherein the total visible light reflectance exhibited by the coated glass article is 6.0% or less.

6. The coated glass article of claim 1, wherein the inorganic metal oxide layers are selected so that sheet resistance exhibited by the coated glass article is greater than $1.0 \times 10^5$ ohm/sq.

7. The coated glass article of claim 1, wherein the fourth inorganic metal oxide layer forms an outer surface of the coated glass article.

8. A laminated glass unit, comprising:
two coated glass articles as claimed in claim 1, wherein the coated glass articles are in a parallel relationship with each other and each coated glass article comprises a major surface adhesively bonded to a polymeric interlayer provided between the coated glass articles,
wherein the laminated glass unit exhibits a total visible light reflectance of 2.5 or less and total visible light transmittance of 95% or more.

9. A coated glass article comprising:
a glass substrate; and
a pyrolytic coating formed on the glass substrate, wherein the pyrolytic coating comprises:
 a first inorganic metal oxide layer deposited on a major surface of the glass substrate, wherein the first inorganic metal oxide layer has a refractive index of 1.6 or more, comprises titanium dioxide, is a pyrolytic coating, and is deposited at a thickness of 5-25 nm,
 a second inorganic metal oxide layer deposited at a thickness of 20-40 nm over the first inorganic metal oxide layer, wherein the second inorganic metal oxide layer has a refractive index which is less than the refractive index of the first inorganic metal oxide layer and comprises silicon dioxide,
 a third inorganic metal oxide layer deposited over the second inorganic metal oxide layer at a thickness of 30 nm or less, wherein the third inorganic metal oxide layer comprises titanium dioxide and has a refractive index of 2.2 or more and wherein the refractive index of the third inorganic metal oxide layer is greater than the refractive index of the second inorganic metal oxide layer, and
 a fourth inorganic metal oxide layer deposited over the third inorganic metal oxide layer at a thickness of 80-150 nm, wherein the fourth inorganic metal oxide layer has a refractive index which is less than the refractive index of the third inorganic metal oxide layer and comprises silicon dioxide;
wherein the coated glass article exhibits a total visible light reflectance of less than 6.5% and a sheet resistance of greater than $1.0 \times 10^5$ ohm/sq.

10. The coated glass article of claim 9, wherein the inorganic metal oxide layers are selected so that sheet resistance exhibited by the coated glass article is $1.0 \times 10^7$ ohm/sq. or more.

11. The coated glass article of claim 9, wherein the total visible light reflectance exhibited by the coated glass article is 6.0% or less.

12. The coated glass article of claim 9, wherein the third inorganic metal oxide layer is deposited at a thickness of 5-25 nm.

13. The coated glass article of claim 9, wherein the third inorganic metal oxide layer is deposited at a thickness of 10-30 nm.

14. A laminated glass unit, comprising:
   two coated glass articles as claimed in claim 9, wherein the coated glass articles are in a parallel relationship with each other and each coated glass article comprises a major surface adhesively bonded to a polymeric interlayer provided between the coated glass articles,
   wherein the laminated glass unit exhibits a total visible light reflectance of 2.5 or less and total visible light transmittance of 95% or more.

15. The coated glass article of claim 9, wherein each of the first inorganic metal oxide layer, second inorganic metal oxide layer, third inorganic metal oxide layer, and fourth inorganic metal oxide layer is pyrolytic.

\* \* \* \* \*